Oct. 20, 1953    R. D. LA COE, JR    2,655,810
PROJECTOR TEMPERATURE INDICATING SLIDE
Filed June 13, 1950

INVENTOR.
RALPH D. LACOE JR.
BY
Wm. H. Dean
AGENT

Patented Oct. 20, 1953

2,655,810

UNITED STATES PATENT OFFICE 2,655,810

PROJECTOR TEMPERATURE INDICATING SLIDE

Ralph D. La Coe, Jr., San Diego, Calif.

Application June 13, 1950, Serial No. 167,794

7 Claims. (Cl. 73—343)

My invention relates to a projector temperature indicating slide, and the objects of my invention are:

First, to provide a temperature indicating slide of this class which may be placed in a projector in the film slideways thereof, to measure the temperature projected onto film in the projector;

Second, to provide a temperature indicating slide of this class which may be used to determine the length of time involved in heating a slide in the projector slideways to a temperature which would be damaging to film;

Third, to provide a temperature indicating slide of this class which is provided with a bimetal spring adjacent to a transparent plate which simulates the thickness of a conventional film, whereby said temperature indicating slide is very sensitive to thermal conditions within a projector;

Fourth, to provide a temperature indicating slide of this class which may be readily and easily inserted in the film slideways of standard projectors;

Fifth, to provide a temperature indicating slide of this class having a transparent scale plate which may be used in a projector for projecting onto a screen the image of the scale and pointer of the slide to indicate internal temperature of the projector; and Sixth, to provide a projector temperature indicating slide of this class which is very simple and economical of construction, efficient in operation, and which will not readily deteriorate or get out of order.

Figure 1:
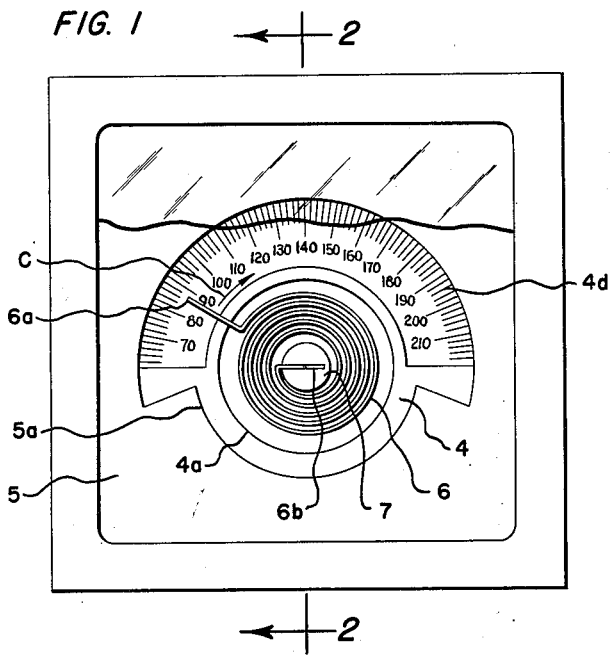
Figure 2:
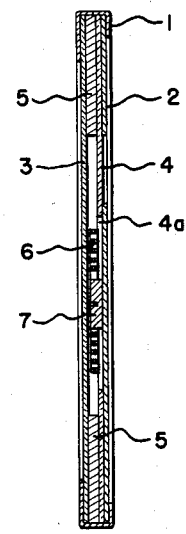
Figure 3:
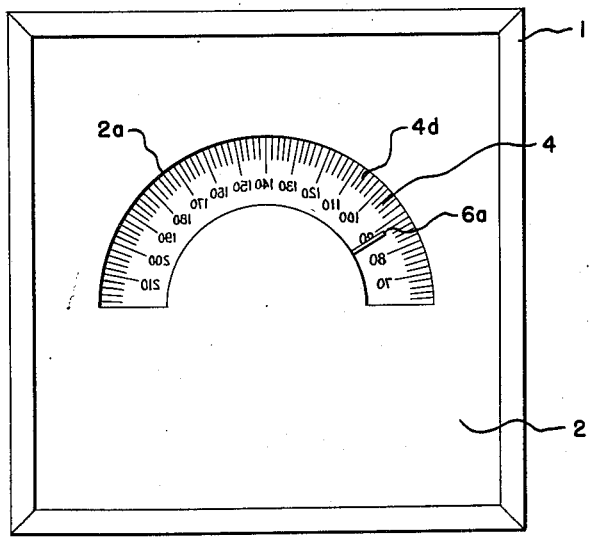
Figure 4:
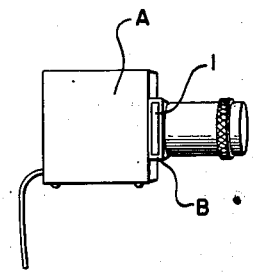

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of my projector temperature indicating slide; Fig. 2 is a sectional view, taken from the line 2—2 of Fig. 1; Fig. 3 is a side elevational view of my temperature indicating slide, showing the opposite side from that as shown in Fig. 1; and Fig. 4 is a perspective view of a conventional projector, showing my projector temperature indicating slide therein.

Similar characters of reference refer to similar parts and portions throughout the several views of the drawings.

The frame 1, back plate 2, transparent plates 3 and 4, spacer plate 5, bimetal spring 6, and the spring boss 7, constitute the principal parts and portions of my projector temperature indicating slide.

The frame 1 is a channel shaped rectangular frame, as shown in Figs. 1 and 2 of the drawings, and supported therein in contiguous relationship to each other are the back plate 2, the transparent plate 4, the spacer plate 5, and the transparent plate 3, all as shown best in Fig. 2 of the drawings. The transparent plate 3 is a continuous transparent plate, similar in thickness to conventional picture slide film. The spacer plate 5 is relatively thicker than the transparent plate 3, and may be made of cardboard or any other suitable material, as desired. This spacer plate 5 is provided with a central opening 5a therein, in which the bimetal spring 6 is mounted. This bimetal spring 6 is secured at its inner end on the hub 7, which is fixed to the metal back plate 2.

It will be noted that the bimetal spring 6 is provided with a pointer portion 6a, which is integral with the helical convolutions of the spring, which are integral with the inner end 6b of the bimetal spring, which is fixed to the hub 7, fused or otherwise secured to the back plate 2 in a suitable manner.

The back plate 2 is provided with an arcuate slot 2a therein, adjacent to the arcuately arranged scale 4d, which is printed on the transparent plate 4, which provides a transparent scale plate through which light may be projected for viewing the internal temperature of a projector on a screen. The transparent scale plate 4, adjacent the back plate 2, is provided with a central opening 4a, which surrounds the central portion of the bimetal spring 6, as shown best in Figs. 1 and 2 of the drawings.

The operation of my projector temperature indicating slide is substantially as follows:

When a person is operating a projector A, as shown in Fig. 4 of the drawings, and wishes to determine the temperature created within the projector by the light therein, he inserts my projector temperature indicating slide in the slideways B of the projector A, and the transparent plate 3 is backwardly facing the light, so that temperature of the transparent plate 3, which simulates the structure of a film, is indicated by the pointer 6a of the bimetal spring 6. This bimetal spring 6 is a conventional bimetal spring, having two laminations of material having a differential coefficient of expansion, which causes the pointer 6a to move in the direction as indicated by the arrow C, when increased temperature is apparent.

When the slide is in the projector, as shown in Fig. 4 of the drawings, the light transmitted through the transparent plates 3 and 4 casts the indication of the scale 4d on the screen, together with the location of the pointer 6a, so that a person may determine how rapidly the temperature rises within a film slide placed in the projector. In this way, a person may determine the time element which is safe for use in the projection of a film, so that it may not be overheated.

If desired, the slide may be removed from the projector and immediately viewed to determine the temperature. This may be done when there is no screen available for the purpose of projecting the temperature indication thereon.

It will be noted that the structure of the spacer 5, as shown in Fig. 2, provides operating room for the bimetal spring 6 intermediate the transparent plates 3 and 4.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A frame of a suitable size to be slidably placed within the film slideways of a conventional projector in the light path thereof, a spiral shaped bimetal temperature responsive means supported in said frame, an indicator at one end of said temperature responsive means, and a scale of indicia of a nature suitable for projection of an image thereof on a screen cooperatively arranged relative to said indicator and supported on said frame, and a transparent plate on which said scale is positioned, whereby light may be projected therethrough for casting an indication of the internal temperature of the projector on a screen.

2. A frame of a suitable size to be slidably placed within the film slideways of a conventional projector in the light path thereof, a temperature responsive means supported in said frame, and a scale of indicia of a nature suitable for projection of an image thereof on a screen cooperatively arranged relative to said means and supported on said frame, a transparent plate on which said scale is positioned, whereby light may be projected therethrough for casting an indication of the internal temperature of the projector on a screen, said temperature responsive means being a spiral shaped bimetal spring rigidly supported on said frame, and having a deflecting end cooperatively related with said scale.

3. A frame of a suitable size to be slidably placed within the film slideways of a conventional projector in the light path thereof, a temperature responsive means supported in said frame, and a scale of indicia of a nature suitable for projection of an image thereof on a screen cooperatively arranged relative to said means and supported on said frame, a transparent plate on which said scale is positioned, whereby light may be projected therethrough for casting an indication of the internal temperature of the projector on a screen, said temperature responsive means being a spiral shaped bimetal spring rigidly supported on said frame and having an arcuately deflecting end cooperatively related with said scale, and said scale being arranged in arcuate form.

4. In a projector temperature indicating slide, a rectangular open frame having outlining channel shaped in cross-section portions open inwardly, a back plate having an open sector for transmitting light and positioned within said channel shaped portions and having a projecting boss, a spiral bimetal spring secured at its inner end to said projecting boss and having a radially disposed pointer at its outer end, a first transparent plate secured in said frame and having an arcuate scale of indicia of a nature suitable for projection of an image thereof on a screen adjacent said radial pointer of said spring.

5. In a projector temperature indicating slide, a rectangular open frame having outlining channel shaped in cross-section portions open inwardly, a back plate having an open sector for transmitting light and positioned within said channel shaped portions having a projecting boss, a spiral bimetal spring secured at its inner end to said projecting boss and having a radially disposed pointer at its outer end, a first transparent plate secured in said frame and having an arcuate scale of indicia of a nature suitable for projection of an image thereof on a screen adjacent said radial pointer of said bimetal spiral shaped spring, a spacer in said frame having an opening therein, within which said bimetal spring is positioned, and a second transparent plate at the opposite side of said projector temperature indicating slide from said first mentioned plate, whereby the heat transfer characteristics of a conventional film may be registered on said scale.

6. In a projector temperature indicating slide, a rectangular open frame having outlining channel shaped in cross-section portions open inwardly, a back plate having an open sector for transmitting light and positioned within said channel shaped portions having a projecting boss, a spiral bimetal spring secured at its inner end to said projecting boss and having a radially disposed pointer at its outer end, a first transparent plate secured in said frame adjacent said back plate and having an arcuate scale of indicia of a nature suitable for projection of an image thereof on a screen adjacent said radial pointer of said bimetal spiral shaped spring, a spacer in said frame having an opening therein, within which said bimetal spring is positioned, a second transparent plate at the opposite side of said projector temperature indicating slide from said back plate, and said bimetal spring being adjacent to said last-mentioned transparent plate, whereby the heat transfer characteristics of a conventional film may be registered on said scale.

7. A frame of suitable size to be slidably placed within the film slideways of a conventional projector and with a portion of said frame in the light path thereof, a bimetal temperature responsive element having an indicator portion deflectable in response to temperature, said element being supported by said frame with the indicator portion in said light path, said frame portion including opaque and light transmitting areas arranged in the form of a temperature scale cooperating with said indicator portion of said element, whereby light from said projector will throw an image of said scale and said indicator portion on a screen, when said frame is in said slideways.

RALPH D. LA COE, Jr.

References Cited in the file of this patent

UNITED STATES PATENTS

| Number | Name | Date |
|---|---|---|
| 1,096,122 | Partington | May 12, 1914 |
| 1,206,253 | Roan | Nov. 28, 1916 |
| 1,218,327 | Shorrock | Mar. 6, 1917 |
| 1,458,168 | Day | June 12, 1923 |